(12) United States Patent
Park et al.

(10) Patent No.: US 7,620,158 B2
(45) Date of Patent: Nov. 17, 2009

(54) VIDEO RELAY SYSTEM AND METHOD

(75) Inventors: Young Jin Park, Aurora, NE (US);
Wayne Hahn, Aurora, NE (US);
Gregory Stephens, Shelton, NE (US)

(73) Assignee: Hamilton Relay, Inc., Aurora, NE (US)

( * ) Notice: Subject to any disclaimer, the term of this patent is extended or adjusted under 35 U.S.C. 154(b) by 706 days.

(21) Appl. No.: 11/218,907

(22) Filed: Sep. 2, 2005

(65) Prior Publication Data
US 2007/0064090 A1 Mar. 22, 2007

(51) Int. Cl.
*H04M 11/00* (2006.01)
*H04N 7/14* (2006.01)

(52) U.S. Cl. ............... 379/52; 379/90.01; 379/93.05; 348/14.01

(58) Field of Classification Search ........... 379/52, 379/90.01, 93.05, 93.06, 93.07, 93.08; 348/14.01–14.06; 704/270, 270.01, 271; 725/106, 109, 110, 725/135
See application file for complete search history.

(56) References Cited

U.S. PATENT DOCUMENTS

| | | | |
|---|---|---|---|
| 4,777,469 A | 10/1988 | Engelke et al. | |
| 4,897,868 A | 1/1990 | Engelke et al. | |
| 4,959,847 A | 9/1990 | Engelke et al. | |
| 5,325,417 A | 6/1994 | Engelke et al. | |
| 5,327,479 A | 7/1994 | Engelke et al. | |
| 5,351,288 A | 9/1994 | Engelke et al. | |
| 5,432,837 A | 7/1995 | Engelke et al. | |
| D364,865 S | 12/1995 | Engelke et al. | |
| 5,517,548 A | 5/1996 | Engelke et al. | |
| 5,581,593 A | 12/1996 | Engelke et al. | |
| 5,604,786 A | 2/1997 | Engelke et al. | |
| 5,724,405 A | 3/1998 | Engelke et al. | |
| 5,809,425 A | 9/1998 | Colwell et al. | |
| D405,793 S | 2/1999 | Engelke et al. | |
| 5,909,482 A | 6/1999 | Engelke | |
| 5,974,116 A | 10/1999 | Engelke et al. | |

(Continued)

FOREIGN PATENT DOCUMENTS

WO WO 01/35240 5/2001

OTHER PUBLICATIONS

International Search Report for PCT/US2006/033245 dated Apr. 26, 2007.

(Continued)

*Primary Examiner*—Melur Ramakrishnaiah
(74) *Attorney, Agent, or Firm*—Foley & Lardner LLP (57) ABSTRACT

A video relay system for allowing impaired individuals to communicate across a network includes a first device capable of sending and receiving audio and video signals where the first device is coupled to a network and includes an application. The application on the first device is configured to communicate with a second device, regardless of whether the second device includes the application. The application is also configured to transmit to and receive from the second device a sign language video signal. When the first device is in a voice carryover mode, the application is configured to transmit an audio signal to the second device. When the first device is in a hearing carryover mode, the application is configured to receive an audio signal from the second device.

18 Claims, 5 Drawing Sheets

U.S. PATENT DOCUMENTS

| | | |
|---|---|---|
| 5,978,654 A | 11/1999 | Colwell et al. |
| 6,075,841 A | 6/2000 | Engelke et al. |
| 6,075,842 A | 6/2000 | Engelke et al. |
| 6,233,314 B1 | 5/2001 | Engelke |
| 6,307,921 B1 | 10/2001 | Engelke et al. |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,546,082 B1 | 4/2003 | Alcendor et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,763,089 B2 | 7/2004 | Feigenbaum |
| 6,950,500 B1 | 9/2005 | Chaturvedi et al. |
| 7,404,001 B2 * | 7/2008 | Campbell et al. ........... 709/231 |
| 2001/0004396 A1 | 6/2001 | Engelke |
| 2001/0005825 A1 | 6/2001 | Engelke et al. |
| 2002/0064256 A1 | 5/2002 | Engelke et al. |
| 2002/0075304 A1 * | 6/2002 | Thompson et al. .......... 345/751 |
| 2002/0080926 A1 | 6/2002 | Engelke et al. |
| 2002/0085685 A1 | 7/2002 | Engelke et al. |
| 2002/0114429 A1 | 8/2002 | Engelke et al. |
| 2003/0032393 A1 * | 2/2003 | Kennedy et al. ........... 455/74.1 |
| 2003/0069997 A1 | 4/2003 | Bravin et al. |
| 2005/0086699 A1 | 4/2005 | Hahn et al. |
| 2005/0094775 A1 | 5/2005 | Smith et al. |
| 2005/0094776 A1 | 5/2005 | Halderman et al. |

OTHER PUBLICATIONS

International Search Report for PCT/US2004/033598 dated Sep. 13, 2007.

* cited by examiner

VIDEO RELAY SYSTEM AND METHOD

FIELD OF THE INVENTION

The present invention relates to communication methods and systems for the deaf, hearing and/or speech impaired. More specifically, the present invention relates to a video relay system and method.

BACKGROUND OF THE INVENTION

Various technologies have been developed to enable hearing-impaired individuals to communicate using telephone communication systems. For example, text telephones, such as Telecommunication Devices for the Deaf (TDD), enable deaf, hard of hearing, and speech-impaired individuals to communicate over the telephone with hearing and speaking parties using conventional telephones. In TDD systems, the hearing-impaired person typically uses a telephone teletype keyboard or TTY, a specially equipped device with a keyboard, to type messages and a text display for presenting responses to the caller.

TDD devices typically require a Weitbrecht/Baudot-compatible modem. In general, a computer cannot communicate directly to TDD because each uses a different coding system to transmit messages over telephone lines. Modems and software are available that can be installed on a computer that allow the computer to communicate directly with a Baudot modem and a TDD. However, such configurations do not solve the need of a hearing-impaired person being able to call anyone at anytime.

Telecommunication relay services or dual party relay services enable deaf, hard of hearing, and speech-impaired individuals to employ text telephones for engaging in a communication session over a telephone network with a person who has a conventional voice telephone. Relay services involve a hearing-impaired individual using a keyboard to communicate and a display device to understand what is being said by the other party. The hearing person hears what is being said and uses his/her voice to communicate. A relay operator acts as the interface in this situation. The relay operator relays information from one communication protocol to another. For example, the relay operator types what the hearing person says and sends the text to the hearing-impaired person. The relay operator reads aloud text messages from the hearing-impaired person so that the hearing person can hear the message.

Conventional relay services are limited. For example, the communication from the relay operator to the hearing-impaired individual is limited to the speed at which the relay operator can type what he or she hears from the non-hearing-impaired individual at the other end of the telephone call.

Thus, there is a need for an improved relay system. Further, there is a need to better facilitate the speed and clarity of telephone relay conversations by allowing the relay operator to use sign language that is communicated by video signal to the hearing-impaired individual. Even further, there is a need to utilize network technologies to enable intervention-free video relay services.

SUMMARY OF THE INVENTION

An exemplary embodiment relates to a video relay system for allowing impaired individuals to communicate across a network. The system includes a first device capable of sending and receiving audio and video signals where the first device is coupled to a network and includes an application. The application on the first device is configured to communicate with a second device, regardless of whether the second device includes the application. The application is also configured to transmit to and receive from the second device a sign language video signal. When the first device is in a voice carryover mode, the application is configured to transmit an audio signal to the second device. When the first device is in a hearing carryover mode, the application is configured to receive an audio signal from the second device.

Another exemplary embodiment relates to a video relay system for communicating across a public switched telephone network (PSTN). The system includes a device capable of sending and receiving audio and video signals where the device is coupled to a network, an application on the device, and a workstation application at a relay center. The application is configured to initiate communications with the relay center via the network, transmit a communication signal from a user of the device to the relay center, and receive a communication signal from the relay center. The workstation application is configured to receive an audio signal from a PSTN user and transmit an audio signal to the PSTN user.

Another exemplary embodiment relates to a video relay method of communicating across a network. The method includes initiating communications between a first device and a second device by way of an application on the first device, regardless of whether the application is on the second device and where the first and second devices are coupled to a network and configured to send and receive audio and video signals. The method further includes presenting a user of the first device with a video window capable of displaying a sign language video signal from a user of the second device and enabling the user of the first device to transmit a sign language video signal to the user of the second device.

Other exemplary embodiments are also contemplated, as described herein and set out more precisely in the appended claims.

BRIEF DESCRIPTION OF THE DRAWINGS

The exemplary embodiments will be described with reference to the accompanying drawings, wherein like numerals denote like elements.

DETAILED DESCRIPTION OF THE EMBODIMENTS

Figure 1:
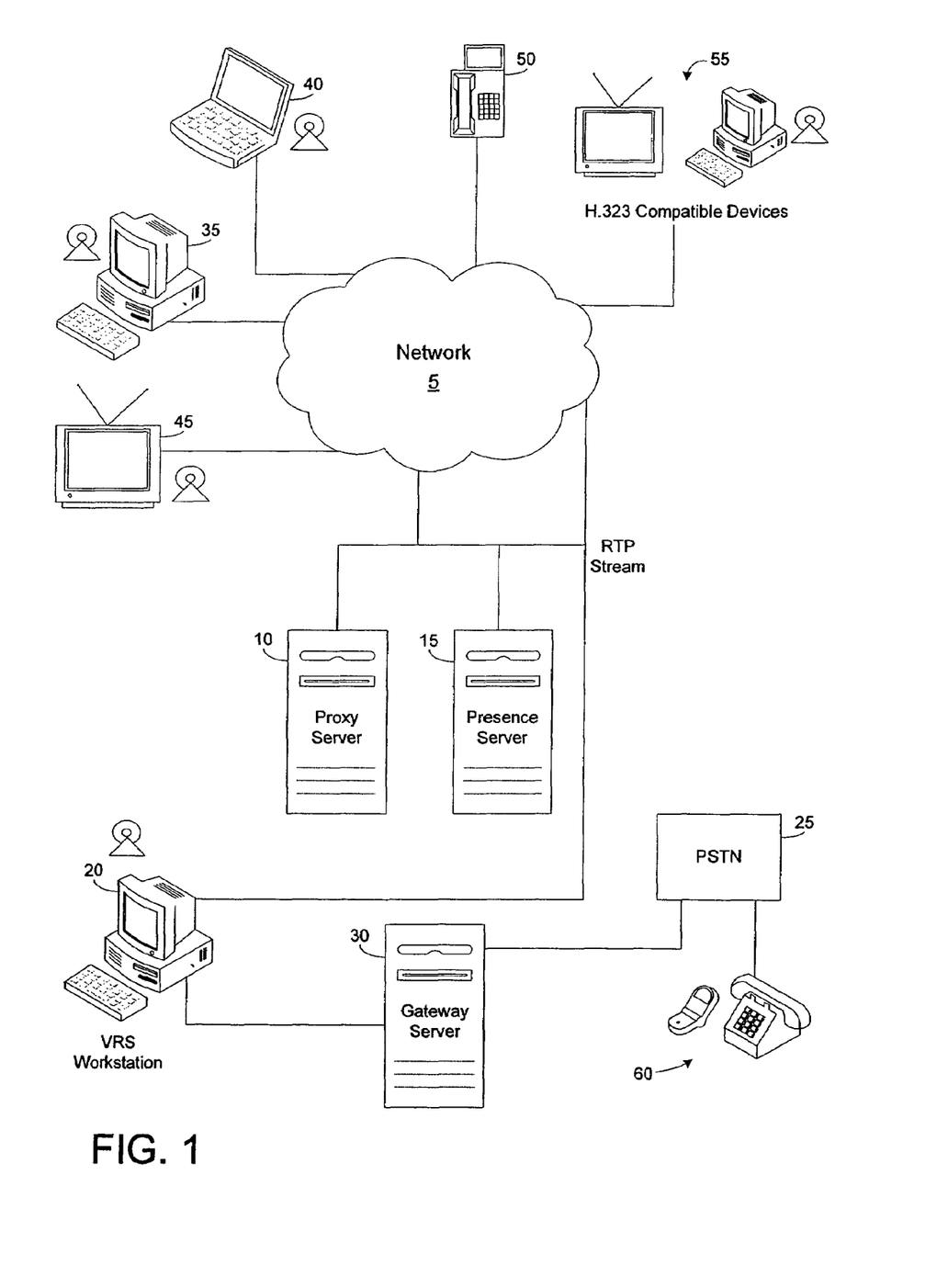
FIG. 1 is a diagram of a video relay system in accordance with an exemplary embodiment.

FIG. 1 illustrates an exemplary video relay system. Video relay enables disabled individuals to communicate with others by relaying video signals, which may contain sign language, to and from the disabled individual. System users (or users) are generally hearing and/or speech impaired individuals who utilize a client application installed on a video capable device to access the video relay system. System users (which can also include non-disabled individuals) are able to place and receive calls across a public switched telephone network (PSTN) 25 or directly through a network 5. System users can access the system through the network 5 and register with the system via a proxy server 10. The network 5 can be the Internet or any other network. Since live video is being sent and received, a broadband or equivalent connection may be required for the system to operate efficiently. The video format used can be Moving Picture Experts Group 4 (MPEG4), H.263, or any other format which allows for high compression, high quality video transmissions. In one embodiment, the bandwidth used for transmissions is no more than 256 K.

A presence server 15 maintains user information and implements message storage and retrieval. A profile database within the presence server 15 can maintain a user's personal information, call preferences, address book, etc. In an alternative embodiment, the profile database is distinct from the presence server. The presence server 15 also keeps a live connection open such that user status can be obtained and in the business context, such that firewalls can be traversed. Once logged into the system, users can initiate contact with a video interpreter located at a video relay system (VRS) workstation 20. The video interpreter can then help the user complete a telephone call over the PSTN 25. A gateway server 30 is used to manage the voice portion of a PSTN relay call and keep records for reporting and tracking calls. The system also allows users to place and receive direct calls to/from other system users and other compatible devices.

Users can access the system and place or receive calls with any number of network capable devices. These devices include, but are not limited to, a personal computer 35, a laptop 40, a network capable television 45, a wireless videophone 50, H.323 compatible devices 55, and any other device capable of executing an application and processing video on its embedded hardware. For instance, kiosks and gaming devices connected to televisions can also be used. Regardless of the device used, the same features and look can be used to provide users with consistent calling experiences. Alternatively, users can obtain themed skins to change the look and feel of the application. In exemplary embodiments, users of the video relay system can choose between text-based relay services or video-based VRS services. From the same device the user can select to make a video relay call, but if video relay is not desired, the user does not have to open a separate application to connect to text relay services. The user can choose an option that connects to IP relay services. IP relay services would use SIP protocols to a SIP proxy that routes the text messages to an IP relay service.

The protocol used to communicate with these devices can be transmission control protocol/Internet protocol (TCP/IP), user datagram protocol (UDP), session initiation protocol (SIP), real time protocol (RTP), hypertext transfer protocol (HTTP), hypertext transfer protocol over secure socket layer (HTTPS), or other network protocol, depending on the embodiment. The user devices can have separate (off the shelf) or integrated web cameras, speakers, and microphones such that users are able to send and receive video and audio signals over the network 5. For example, video packets can be secured by encapsulating the packets in an HTTPS video stream. User devices can also have a phone jack for users who do not wish to use speakers and a microphone to implement voice carryover/hearing carryover (VCO/HCO). In one embodiment, users access the system through a web site equipped with software that executes on the user's device. In an alternative embodiment, devices used to access the system have a client application installed on them.

The client application is an application that allows a user to log into and register with the system. The client application also incorporates the features of a videophone onto the user device. The client application can include video windows presenting the user with a self view and a view of the person(s) called. Other features include a call history log (calls in, calls out, and missed calls all with quick redial capability), the ability to create and maintain a contact list, a speed dial list, text messaging capability, chatting capability (using open source instant messaging (IM) protocols), caller ID (in the form of an SIP phone number, IP address, or name from the user's contact list), call transferring (for office environments), call waiting, a hold feature, call blocking (user can block calls from a particular number or address), caller ID block (users can block their ID when calling another user), video and audio messaging capability, pager notification of calls (with or without caller ID), status message generation, and error message generation. The client application can reside on a variety of platforms (including wireless devices) and is compatible with a variety of operating systems, including, but not limited to Windows, Macintosh, UNIX, and Linux. In one embodiment, the client application executes on any platform equipped with the Java Runtime Environment (JRE). The portability of the system allows information entered by the user on one device to be available to the user on other networked devices.

In the embodiment shown in FIG. 1, system users log in to the video relay system through the network 5, using the client application installed on a user device, such as the personal computer 35. Login can be implemented by the user entering a password such that user account information and preferences are kept confidential and protected. Users with SIP devices are registered and logged into the system through the proxy server 10, which stores registered device information and a network address of the device. The proxy server 10 passes this information to the presence server 15 such that the presence server 15 can be polled by the client application to identify which system users are available to receive a call. In an alternative embodiment, any SIP device can be registered with the system regardless of whether the SIP device includes the client application. In another alternative embodiment, constant identifiers such as usernames which translate into network addresses can be associated with system users to ease availability determinations. Identifiers are easier to remember than numeric network addresses, and in some environments, the network address changes every time a device is turned on. If the user device is an H.323 compatible device 55, user login is via an H.323 gatekeeper incorporated within the proxy server 10. In an alternative embodiment, the H.323 gatekeeper is distinct from the proxy server. The proxy server 10 also processes and routes calls from users with SIP devices and H.323 compatible devices 55.

Users can enter call setup preferences and contact list information into the system. Entered data can be stored in the client application. The entered data can also be stored in the profile server within the presence server 15 and made accessible to the user of the application regardless of the physical installation of the application or the device used by the user to log in. For example, a user can initially enter a contact list into the laptop 40 and later access and/or edit the contact list from the wireless videophone 50. The user's contact list can be synchronized with the address books of other software, such as Microsoft Outlook, available from Microsoft Corp. of Redmond, Wash., U.S.A. Preferences include whether the user would like HCO, VCO, or no carryover, whether the user's status is made available to others, and whether the user would like to receive audio and/or video messages. User status, which is also maintained by the presence server 15, includes information regarding whether a user is logged into the system and/or ready for a call. Status information allows other users and video interpreter operators to easily determine whether any particular user is available for a call. In one embodiment, users can activate a 'busy' indicator to let others know that even though he/she is online, that he/she is not ready to accept any calls. In an alternative embodiment, an online directory of registered system users and their status is made available such that user availability can easily be determined. The online directory can also allow users to directly add individuals to their contact list.

The presence server 15 also manages the sending and retrieving of audio and video messages. For example, messages can be sent from a user to other users with the client application, to other SIP devices, and to other H.323 compatible devices 55. Likewise, messages can be received from other system users, other SIP devices, and other H.323 compatible devices 55. Messages can also sent from a PSTN caller to a system user through a video interpreter. For instance, if a PSTN caller attempts to call a user, but the user is not available, the PSTN caller can speak a message to the video interpreter. If the user is not hearing impaired, the verbal message can be saved in the presence server 15 for the user. If the user is hearing impaired, the video interpreter can record a video of a signed version of the message for the user to view at a later time. Upon logging in, users are notified of any received messages, which they can watch/listen to at their convenience. Users can also be notified by email or page each time a new message is received.

With the help of a video interpreter, system users can place calls across the PSTN 25 to a standard telephone/cell phone 60. Alternatively, PSTN callers can place calls to and leave messages for system users by placing a call to the VRS workstation 20. The VRS workstation 20 is equipped with a device capable of sending and receiving audio and video signals across the network 5, a camera for sending video images to a user, a microphone, and an SIP (or regular) phone for communicating with the PSTN caller. In one embodiment, the SIP phone is implemented as software within a workstation application. The gateway server 30 is the interface between the VRS workstation 20 and the PSTN 25. The gateway server 30 manages the voice portion of the relay or conference call and also keeps call records for the purpose of reporting, tracking, and billing calls. In one embodiment, a router can be used to route communication signals from the network to the VRS workstation, and vice versa.

Figure 2:
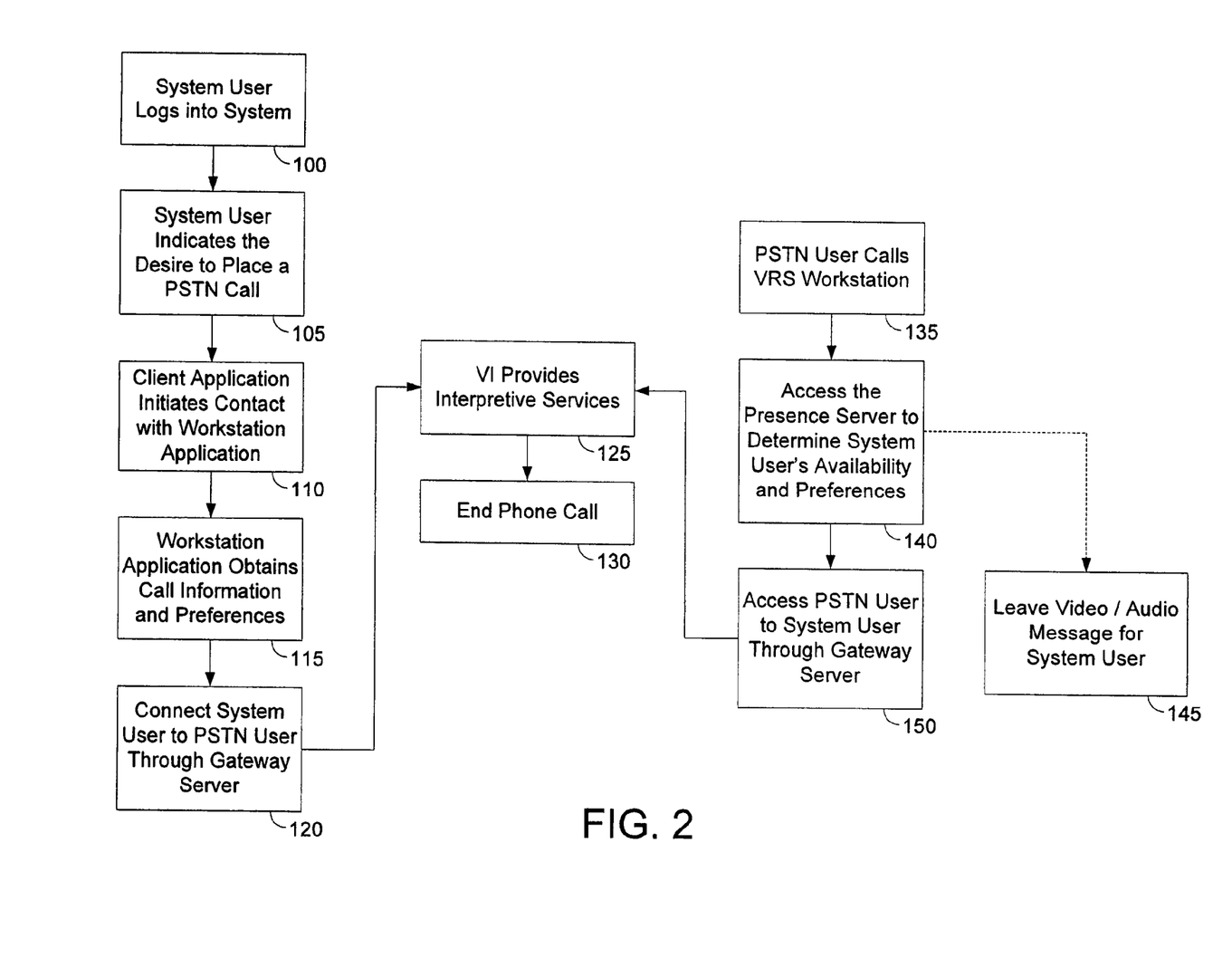
FIG. 2 is a flow diagram illustrating exemplary operations implemented in a public switched telephone network (PSTN) call.

FIG. 2 illustrates exemplary operations performed in video relay-assist calls across a PSTN. Additional, fewer, or different operations may be performed in accordance with alternative embodiments. The system allows users to access a video relay system (VRS) workstation and make or receive calls across the PSTN without a second telephone line being utilized. In an operation 100, the system user logs into the system via the client application installed on the system user's access device. If the user logs in with an SIP device, login is implemented through the proxy server described with reference to FIG. 1. If the user logs in with an H.323 device, login is implemented through the H.323 gatekeeper, which can be incorporated into the proxy server. Upon acceptance of the user's login name and password, a connection with the user device and the presence server is established.

Once logged in, the system user indicates the desire to place a PSTN call in an operation 105. The user indication can be by pressing a button, clicking a mouse, verbal instruction, or other method depending on the embodiment. In one embodiment, a tool bar on the client application provides one click links to the VRS workstation, for making direct calls, for customer service, and/or to favorite websites. In an operation 110, the workstation application at the VRS workstation is contacted by the client application on the user's device. In one embodiment, load balancing operations are performed to ensure optimal VRS workstation utilization and minimal delays for system users. Bandwidth load balancing can be implemented by utilizing multiple servers to direct and handle device traffic. Load balancing can also be implemented by distributing calls from a busy relay center to a relay center with video interpreters standing by. The workstation application manages the relay call and interacts with the client application to determine the codec for the best quality image. In one embodiment, the client application sends a list of possible codecs to the VRS workstation and the VRS workstation determines which codec to use. The client application can enable the use of a wider range of codecs (such as MPEG4) than are ordinarily available with certain protocols. The connection between the system user and the VRS workstation can be a TCP/IP connection, a UDP connection, or other network connection. In one embodiment, video is transmitted between the user device and the VRS workstation using an RTP stream and audio is transmitted via RTP. RTP is a packet based communication protocol that adds timing and sequence information to each packet to allow reassembly of delivered packets to produce real time audio/video information.

In an operation 115, the workstation application accesses the presence server to obtain calling instructions (standard greeting) and user preference information (VCO/HCO/no carryover) such that PSTN calls are more quickly enabled. In an alternative embodiment, the client application can access the presence server and obtain calling information and user preferences and provide them to the workstation application. The phone number that a system user wishes to call can be passed from an address book in the client application to the workstation application. Alternatively, the phone number and other information can be obtained from the client application as direct inputs by the user.

In an operation 120, the call across the PSTN is placed. The call can be automatically placed by the workstation application or manually placed by the video interpreter, depending on the embodiment. Upon call placement, the gateway server described with reference to FIG. 1 can be utilized as the interface between the VRS workstation and the PSTN. The gateway server manages the voice portion of the relay call and keeps records for the purpose of reporting and tracking PSTN calls. In an alternative embodiment, the gateway server can be incorporated into the workstation application.

In an operation 125, the video interpreter provides interpretive services to the system user as necessary and VCO/HCO services are implemented directly over the network without the need for a phone at the user's location. This direct communication is accomplished by using VoIP and TCP/IP technology. For instance, if the user is hearing, but not speech, impaired, VCO can be implemented such that the user's voice carries across the PSTN to the individual being called. In such a case, the video interpreter interprets responses from the called individual and conveys those responses to the user via sign language. If the user is speech, but not hearing, impaired, HCO can be implemented such that the called individual's voice is transmitted to the user. In that case, the user signs (and/or types) responses to the video interpreter and the video interpreter verbalizes the responses to the called individual. If the user is both speech and hearing impaired, the user signs to the video interpreter and the video interpreter verbalizes to the called individual and signs back any responses to the user. Bandwidth can be preserved by only sending audio signals as required by the mode of operation (HCO/VCO). A similar approach can be used when implementing direct calls. In one embodiment, video signals are sent from the video interpreter to the system user and from the system user to the video interpreter regardless of the mode of operation (HCO/VCO).

During a call, users have the ability to change and manipulate the video screen(s) and pictures by using full screen video, detached video screens, and/or minimized video screens. A privacy feature allows the user to turn their audio and video feeds (incoming and/or outgoing) on and off during a call. The video interpreter and system user can also communicate with one another via text messaging through the same connection. In an operation 130, the PSTN call is ended. Upon call completion, the system user can either disconnect from the VRS workstation or place another PSTN call.

Calls can also be initiated by PSTN callers to system users. In an operation 135, the PSTN caller calls the VRS workstation and provides the system user's identifier, login name, IP address, SIP address, or other identifier. If the user has enabled the status check functionality provided by the presence server, the workstation application or video interpreter can access the presence server in an operation 140 and immediately determine whether the system user is logged in and/or available for a call. If the user has the status check disabled, the video interpreter can attempt to contact the user by sending a notification to the user's client application. If a user is unavailable to take a call, the PSTN caller can leave a video or audio message in an operation 145.

If the system user is available to take the call, the PSTN caller is connected to the system user through the gateway server in an operation 150. The video interpreter provides interpretive services to the system user as necessary, in an operation 125. In an operation 130, the PSTN call is ended and the system user has the option of disconnecting from the VRS workstation or placing a PSTN call to another individual.

The system can also be used to make conference calls such that one or more system users are able to simultaneously communicate with one or more PSTN callers. Conference calling can be implemented without the use of additional devices. The workstation application enables this functionality by combining VoIP, SIP and TCP/IP technologies. For the case involving one system user and multiple PSTN callers, the SIP phone (hard or soft) incorporated into the workstation application can be used to dial and maintain connections to the multiple PSTN lines. For the case involving multiple system users, the presence server can be used in conjunction with the client application to provide a split screen view such that the system users can view all of the other participating system users and the video interpreter.

Figure 3:
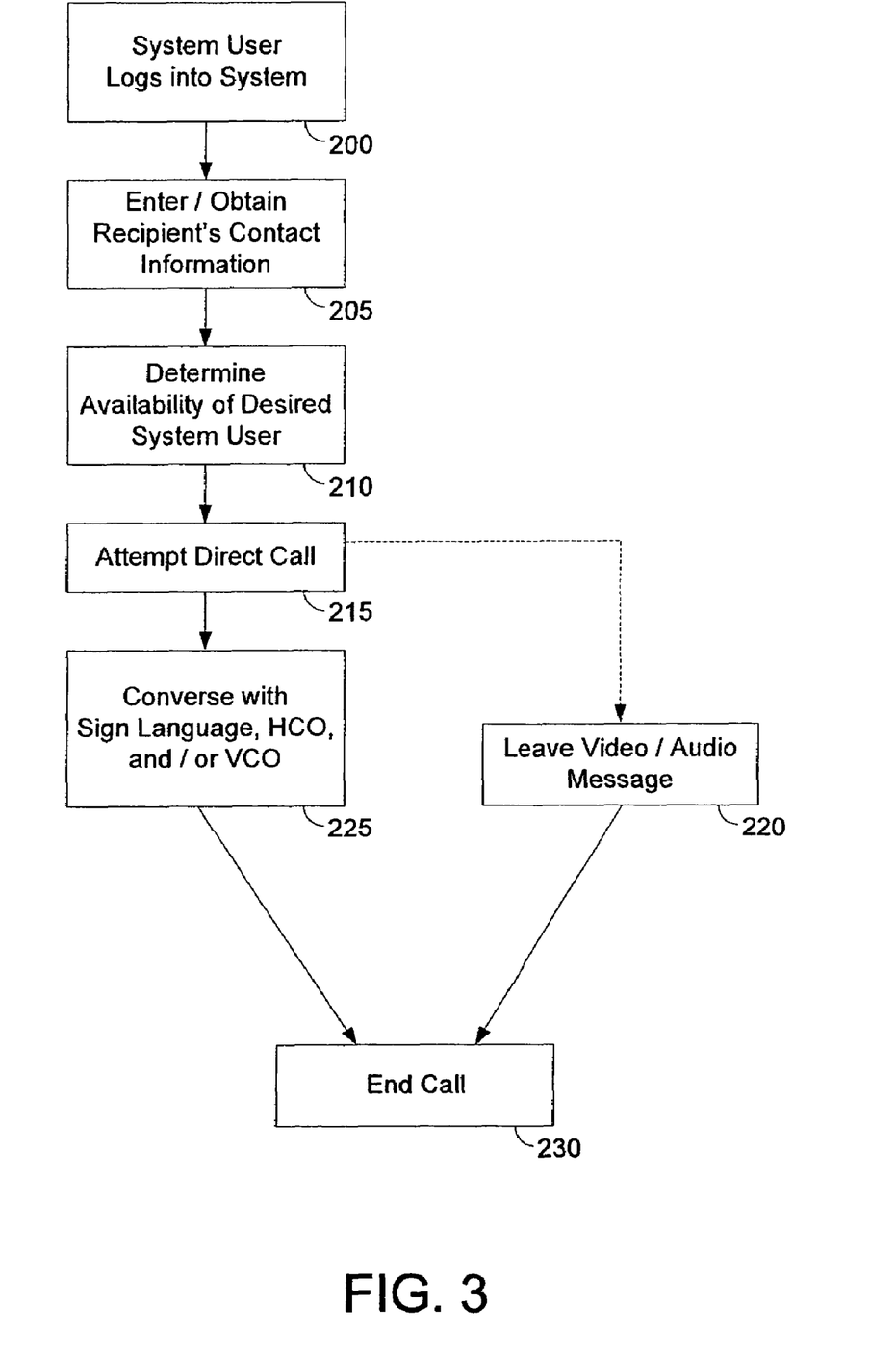
FIG. 3 is a flow diagram illustrating exemplary operations implemented in a direct call.

FIG. 3 illustrates exemplary operations performed during direct calls initiated by a VRS system user without intervention from the VRS workstation. Additional, fewer, or different operations may be performed in accordance with alternative embodiments. Direct calls can be made to other system users, users of other SIP devices, and users of other H.323 compatible devices. The protocol used for direct calls can be RTP, SIP, or a combination of protocols. In an operation 200, a system user logs into the system using any device capable of executing the client application and processing video. In an operation 205, the system user enters contact information for the call recipient or accesses his/her contact list. If the recipient is another system user, the contact information can consist of a name or username. If the recipient is not a registered user, the system user can provide the recipient's IP or SIP address.

In an operation 210, the system user's client application can access the presence server to determine whether a recipient system user is available for a call. The system user can be notified if the intended recipient is not logged in or unavailable. Upon such notification, the system user has the option to be notified when the intended recipient is next available for a call (i.e., logged in and not busy). Alternatively, system users can access a directory maintained by the presence server to determine the current status and availability of any other system user. If the recipient is not a system user or is a system user with his/her user status disabled, the call is attempted without knowledge of the recipient's availability.

The direct call to the desired recipient is attempted in an operation 215. If the recipient is unavailable, but is another system user, an audio message or video message using a high quality video codec can be left in an operation 220. Video and audio messages can also be sent to other system users independent of a call attempt. Two way pagers and other messaging devices are also compatible with the system such that text messages can be received from and sent to such devices. Messages are stored in the presence database and can be accessed by recipients at their convenience. Upon leaving a message, the system user ends the call in an operation 230. If the recipient is available for a call, a conversation takes place in an operation 225. Depending on the needs of the caller and the recipient, any or all of HCO, VCO, and sign language through video can be used during the conversation. Conversation can also take place via text messaging while the call is in progress.

Direct calls can also be initiated by non-system users if the non-system user knows the IP or SIP address of the system user. If a system user recipient is unavailable to take a call, the non-system user can leave an audio or video message. Further, direct conference calls can also be implemented such that a system user is able to simultaneously converse with multiple individuals without intervention from the VRS workstation. Direct conference calls are enabled by cooperation between the presence server and client application(s) such that each system user can view each party participating in the conversation via a split screen. In an alternative embodiment, non-PSTN calls can be made or received through the VRS workstation, with or without the services of a video interpreter.

In one embodiment, non-PSTN calls can be implemented using only video communications between the participating devices. Similarly, PSTN calls can be implemented using only video communications between the VRS workstation and the client application. The use of video only, with RTP or a similar protocol, allows individuals with low bandwidth connections to communicate efficiently.

Figure 4:
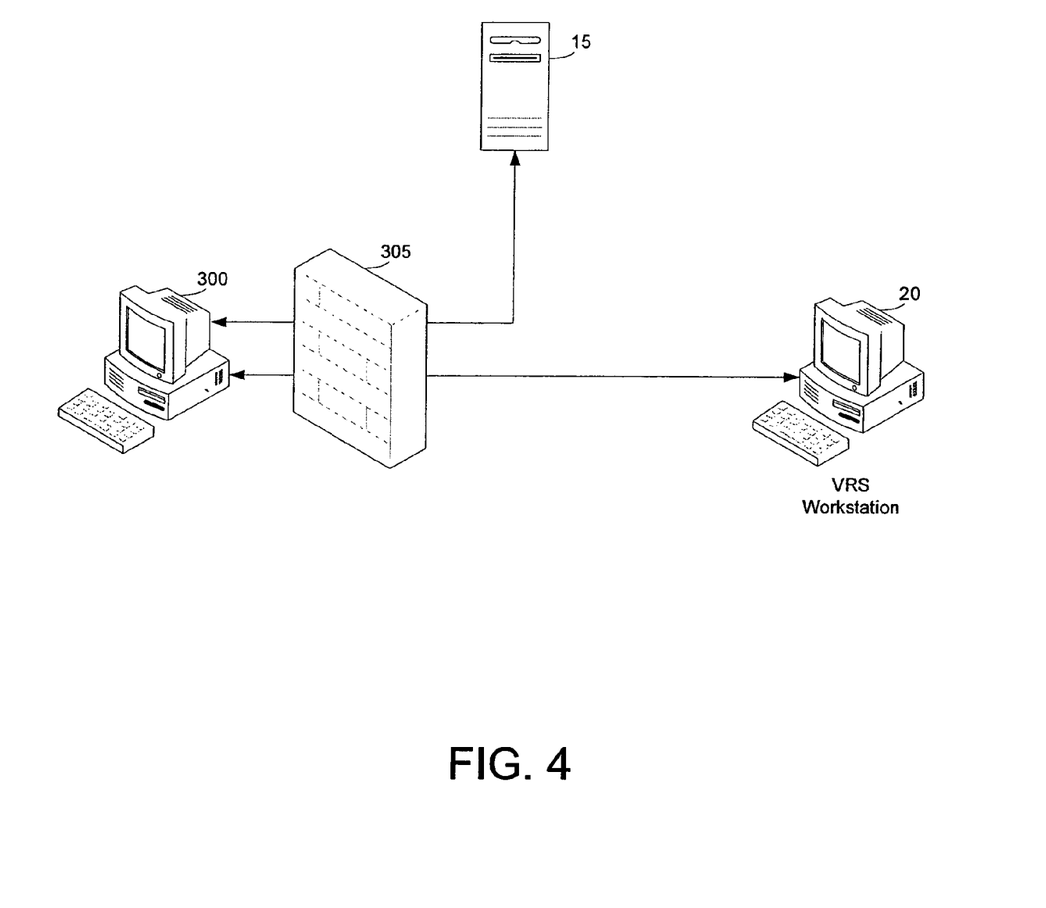
FIG. 4 is a diagram illustrating communication routes during a normal firewall setting.

FIG. 4 illustrates a VRS workstation call during a normal firewall situation. The system user logs into the proxy server and is connected to the presence server 15. The connection between the presence server 15 and the user device 300 is maintained for the duration of the login session. In one embodiment, HTTP/HTTPS protocol communications are used to maintain the connection because these protocols work through one of several network access ports that are commonly left open when a firewall is used. The connection with the presence server 15 allows the system user to access and/or edit his/her user profile and retrieve any audio or video messages. The maintained connection also provides the presence server 15 with status information of the system user. The call can be initiated by either the user through the client application on the user device 300 or the VRS workstation 20 (through the video interpreter or the workstation application). If the system user wishes to initiate the call, the user's client application contacts the VRS workstation 20 directly, through the user's firewall 305. If the VRS workstation 20 initiates the call, the system user is notified via a presence server (with firewall and call control software) and asked to implement a direct communication with the VRS workstation 20. Because the user device 300 initiates the communications, the firewall 305 permits the IP packets to pass through. Similarly, call signaling information, audio data, and video data is passed directly from the client application to the VRS workstation and vice versa once a call is in progress because the client initiated the communication. The VRS workstation 20 also receives information from and sends information to the presence server 15. This information can include status information, messages, and notifications of incoming calls from the PSTN. In one embodiment, the protocol used for communication between the VRS workstation and the presence server is HTTP/HTTPS.

Figure 5:
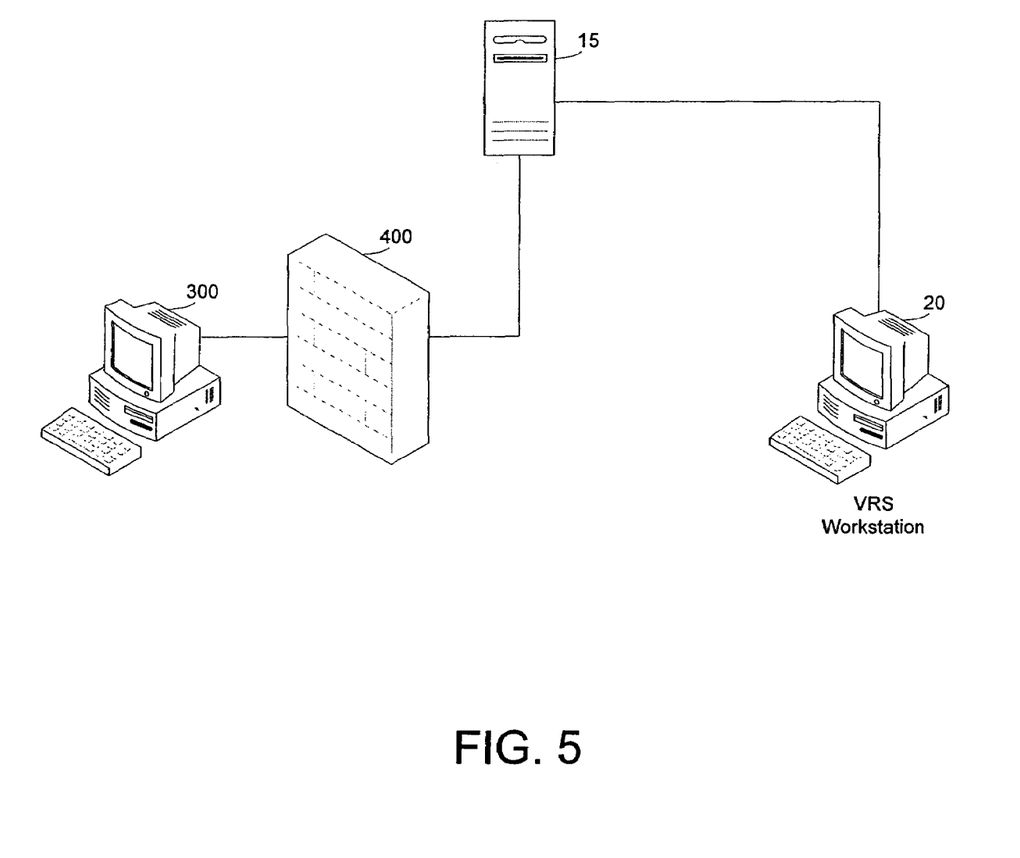
FIG. 5 is a diagram illustrating communication routes during a high firewall setting.

FIG. 5 illustrates a system to traverse a strong firewall 400. Strong firewalls are often encountered in the business context because they provide enhanced security by examining incoming data and blocking the data that does not meet specified security criteria. Calls can be initiated by the user through the user device 300 or the VRS workstation 20. In this embodiment, all of the call signaling, audio data, and video data is processed through the presence server that includes firewall software and call buffering and streaming 15. In one embodiment, an HTTP/HTTPS connection is maintained between the user device and presence server (with call buffering and streaming) and between the VRS workstation and the same presence server. Any data, whether audio, video, or control, is streamed to the presence server 15 before being pulled in by either the user device 300 or the VRS workstation 20.

It is understood that although the detailed drawings and specific examples describe exemplary embodiments of a video relay system and method, they are for purposes of illustration only. The exemplary embodiments are not limited to the precise details and descriptions described herein. For example, although the system was described with respect to relay services for general conversations, the system can also be used for sales, customer service, conferencing, interviews, etc. While particular devices and structures are described, other devices and structures could be utilized according to the principles of the present invention. Various modifications may be made and the details disclosed without departing from the spirit of the appended claims.

What is claimed is:

1. A video relay system for communicating across a public switched telephone network (PSTN), the system comprising:
 a device capable of sending and receiving audio and video signals, wherein the device is coupled to a network;
 an application configured to execute on the device, wherein the application is configured to cause the device to:
  initiate communications with a relay center via the network;
  transmit a communication signal from a user of the device to the relay center; and
  receive a communication signal from the relay center; and
 a workstation application configured to execute at the relay center, wherein the workstation application is configured to:
  receive an audio signal from a PSTN user; and
  transmit an audio signal to the PSTN user.

2. The video relay system of claim 1, wherein the application is further configured to provide the user of the device with access to stored audio and video messages.

3. The video relay system of claim 2, wherein the messages originate from any one of an SIP device and an H.323 compatible device.

4. The video relay system of claim 1, further comprising a server device coupled to the network, wherein the server device is configured to maintain status information of the device.

5. The video relay system of claim 4, wherein the server device is further configured to store preference information entered by the user of the device.

6. The video relay system of claim 4, wherein the server device is further configured to store audio and video messages for the user of the device.

7. The video relay system of claim 1, wherein the application on the device enables the selection between text-based relay services and video-based relay services.

8. The video relay system of claim 7, wherein communications for text-based relay services and video-based relay services are carried out on the device using a common application.

9. The video relay system of claim 1, wherein the application on the device enables the selection of internet protocol (IP) relay services.

10. The video relay system of claim 1, wherein the application on the device is further configured to receive a notification of an incoming PSTN call.

11. The video relay system of claim 1, wherein the application on the device is further configured to provide the relay center with contact information for a PSTN call recipient.

12. The video relay system of claim 1, wherein the workstation application is further configured to initiate communications with a PSTN call recipient.

13. The video relay system of claim 1, wherein the workstation application is further configured to receive an incoming PSTN call.

14. The video relay system of claim 1, wherein the workstation application is further configured to create audio and video messages for the user of the device if the user is unavailable to take an incoming PSTN call.

15. The video relay system of claim 1, wherein the application on the device is further configured to operate in a voice carryover mode such that the communication signal from the user of the device to the relay center includes an audio signal and the communication signal from the relay center includes a sign language video signal produced by a video interpreter and corresponding to words spoken by the PSTN user.

16. The video relay system of claim 15, wherein the communication signal from the user of the device to the relay center also includes a video signal.

17. The video relay system of claim 1, wherein the application on the device is further configured to operate in a hearing carryover mode such that the communication signal from the user of the device to the relay center includes a sign language video signal and the communication signal from the relay center includes an audio signal.

18. The video relay system of claim 1, wherein the workstation application is further configured to maintain status information of the user of the device such that others can determine whether the user of the device is available for a call.

\* \* \* \* \*